No. 876,061. PATENTED JAN. 7, 1908.
G. B. KATZENSTEIN.
FRUIT CRATE.
APPLICATION FILED AUG. 23, 1905.
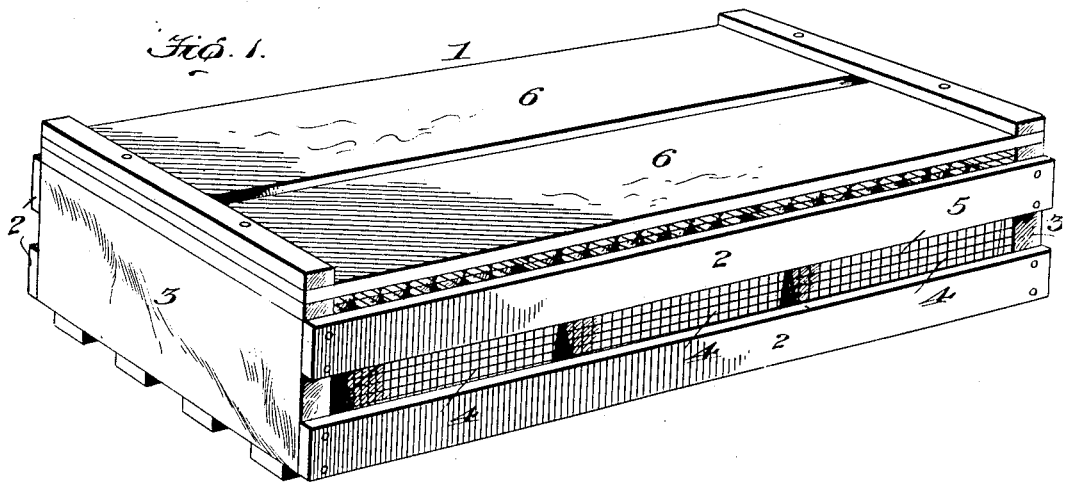
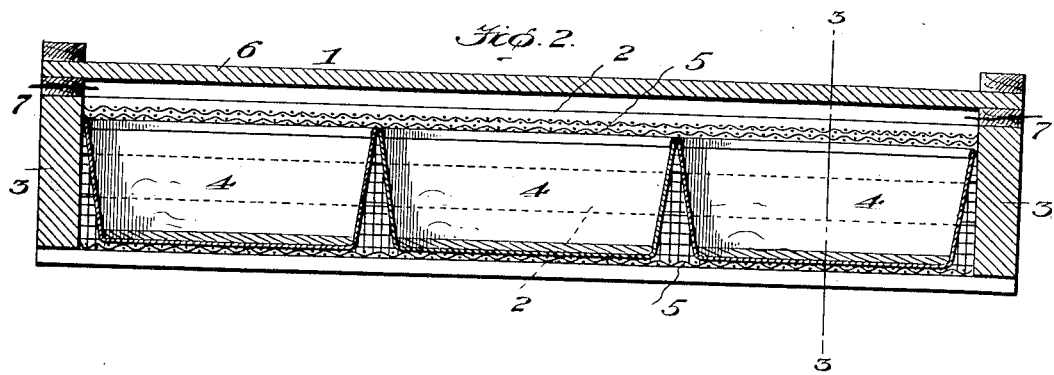
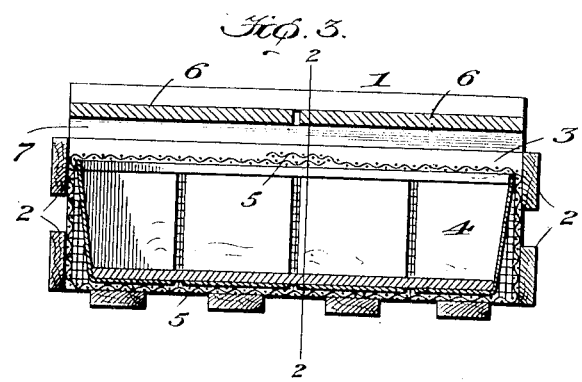
Witnesses
Inventor
George B. Katzenstein
By Cochran & Co
Attorneys

UNITED STATES PATENT OFFICE.

GEORGE B. KATZENSTEIN, OF SACRAMENTO, CALIFORNIA.

FRUIT-CRATE.

No. 876,061.  Specification of Letters Patent.  Patented Jan. 7, 1908.

Application filed August 23, 1905. Serial No. 275,411.

*To all whom it may concern:*

Be it known that I, GEORGE B. KATZENSTEIN, a citizen of the United States, and resident of Sacramento, in the county of Sacramento and State of California, have invented certain new and useful Improvements in Fruit-Crates, of which the following is a specification.

This invention relates to certain new and useful improvements in means for packing fruit, having for its objects primarily to protect the fruit from pilfering as well as from the injurious effects of foreign matter, such as cinders etc., which are apt to become blown or sifted into the crate or boxes in which the fruit is contained.

It has been found that in the handling of fruit packed and shipped in boxes or baskets, when passing from hand to hand and reshipped by express etc., the fruit is picked at by various parties where the fruit protrudes between the cover and the slats at the sides and ends of the crates, when crates with slotted ends are employed, and this detracts from the appearance as well as the value of the fruit. I aim to prevent this meddling with the fruit and thus insure that it shall reach the party to whom it is shipped in the same condition that it leaves the shipper.

I place within the crate or box a mesh or mat of netting of suitable mesh, which envelops the baskets, passes completely around and over them and comes together at the top of the package, the lid, when placed upon the top of the box or crate, holding the netting in place. The netting thus covers the fruit on top and also upon each side of the crate or package where heretofore it has been exposed. To cut, strain or stretch this netting sufficiently to obtain access to the fruit will practically damage the package and make the receiver morally, if not financially, liable and to that extent the shipper is protected. This netting adds to the sanitary and cleanly condition of the contents of the package and therefore keeps the fruit cleaner and in better condition. The netting does not obstruct the passage and free circulation of the air and particularly cold air when under refrigeration while the package is in transit.

I preferably employ white or unbleached, not colored, netting so that it shall in no wise be deleterious should the fruit become spoiled or wet for any reason during transportation.

Other objects and advantages of the invention will hereinafter appear and the novel features thereof will be specifically defined by the appended claims.

The accompanying drawings illustrate one way of carrying out my invention, and the said drawings, together with the numerals of reference marked thereon, form a part of this specification.

In the said drawings Figure 1 is a perspective view of a crate packed in accordance with my invention. Fig. 2 is a vertical longitudinal section through the same on the line 2—2 of Fig. 3. Fig. 3 is a vertical cross section as on the line 3—3 of Fig. 2, the scale being reduced.

Like numerals of reference indicate like parts in the different views.

Referring to the drawings 1 designates a crate with slatted sides 2 and preferably closed ends 3. It is to be understood, however, that while this form of crate is herein shown, the invention is in no wise restricted thereto, as any preferred form of crate may be used, that shown being merely as a conventional form for the purpose of illustration.

4 are the baskets or receptacles in which the fruit, such as grapes, plums, peaches or the like, are placed.

The present invention is in no wise restricted to the particular construction or kind of basket employed, that shown being the usual form used.

In packing the fruit for shipment, I place within the crate 3, 4 or more of the baskets, splint baskets generally being employed, filled with the fruit, first placing within the crate a piece of netting or the like 5, which is of sufficient size to cover the bottom of the crate and extend up upon all sides, so as to incase the baskets, and to extend over the top of the said baskets as seen in Fig. 2, being preferably overlapped as seen in Fig. 3. This covers the fruit not only upon the top but at the sides where otherwise it might be reached from the outside of the crate, through the openings between the slats at the sides of the crate, and access to the fruit cannot be had except by tearing, cutting or otherwise tampering with the netting to such an extent as to be readily discovered. The cover 6 of the crate is then secured in position, and if the fruit in the basket extends up into the space 7 usually left between the fruit and the under side of the cover the latter will, by its pressure on the top of the fruit, keep the netting sufficiently stretched over the fruit on each side of the package.

Modifications and variations and changes which come within the scope of the protection prayed may be made without departing from the spirit of the invention or sacrificing any of its advantages.

What is claimed as new is:—

1. A crate, a plurality of baskets therein, and a mat of netting in a single piece disconnected from the crate and baskets and covering the bottoms, sides and tops of said baskets, and a cover to the crate disconnected from said netting.

2. A crate, a mat of a single continuous piece of reticulated material laid loosely therein and disconnected from said crate with portions extended above the top of the crate, baskets for fruit placed within said crate and upon said material, with the said material placed over the tops of the baskets and its ends overlapped, and a cover to the crate, all substantially as and for the purpose specified.

3. A fruit shipping package comprising a crate having slatted sides and bottom, a mat of a single continuous piece of reticulated material laid loosely within said crate and disconnected therefrom at all points, with portions extended above the top of the same, baskets for fruit placed within said crate, and upon said reticulated material with the said material placed loosely over the tops of the baskets and its ends overlapped thereon, and a cover to the crate also disconnected from said material and disposed above and out of contact with the basket.

4. A fruit-shipping crate, comprising a crate proper, its cover, a single continuous piece of reticulated material loosely laid therein and disconnected from said crate at all points, a plurality of disconnected baskets in said crate and surrounded on all sides by and disconnected at all points from said reticulated material, with the ends of the material overlapped upon said baskets and disconnected from the cover.

5. A crate, a single continuous piece of netting loosely laid therein and entirely disconnected from said crate at all points, a plurality of disconnected baskets in said crate and surrounded on all sides by and disconnected at all points from said netting, and a cover for said crate, the ends of said netting being designed to be overlapped upon the top of the baskets to cover the fruit therein, said netting being entirely disconnected from the cover and at all points surrounding the fruit in the baskets and preventing pilfering thereof.

In testimony whereof I have signed my name to this specification in the presence of two subscribing witnesses.

GEORGE B. KATZENSTEIN.

Witnesses:
  CHAS. F. HOWLAND,
  A. R. FINK.